US011470020B2

(12) United States Patent
Roy et al.

(10) Patent No.: US 11,470,020 B2
(45) Date of Patent: Oct. 11, 2022

(54) AUTOMOTIVE PACKET DATA SWITCH WITH PIPELINE DIVERSITY

(71) Applicant: NXP B.V., Eindhoven (NL)

(72) Inventors: Rajeev Roy, Den Bosch (NL); Lucas Pieter Lodewijk Van Dijk, Kranenburg (DE); Steffen Müller, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/944,061

(22) Filed: Jul. 30, 2020

(65) Prior Publication Data
US 2022/0038393 A1 Feb. 3, 2022

(51) Int. Cl.
H04L 12/28 (2006.01)
H04L 49/00 (2022.01)
H04L 45/00 (2022.01)
H04L 67/12 (2022.01)
H04L 45/745 (2022.01)

(52) U.S. Cl.
CPC .......... H04L 49/3063 (2013.01); H04L 45/54 (2013.01); H04L 45/74591 (2022.05); H04L 67/12 (2013.01)

(58) Field of Classification Search
CPC . H04L 49/3063; H04L 45/54; H04L 45/7457; H04L 67/12
See application file for complete search history.

(56) References Cited

U.S. PATENT DOCUMENTS

| 10,057,292 | B2 | 8/2018 | Molter et al. | |
| 2008/0201772 | A1* | 8/2008 | Mondaeev | H04L 63/20 726/13 |
| 2015/0241553 | A1* | 8/2015 | Gehrels | G01R 31/005 342/173 |
| 2017/0235698 | A1* | 8/2017 | van der Maas | H04L 63/14 710/106 |
| 2017/0316134 | A1* | 11/2017 | Hyodo | G06F 30/33 |
| 2020/0073774 | A1 | 3/2020 | Deb et al. | |
| 2020/0073786 | A1 | 3/2020 | Schat et al. | |
| 2020/0092158 | A1 | 3/2020 | Weber et al. | |
| 2020/0304532 | A1* | 9/2020 | Haga | H04L 12/40 |

(Continued)

FOREIGN PATENT DOCUMENTS

| EP | 2892199 A1 | 7/2015 |
| EP | 3370389 A1 | 9/2018 |
| EP | 3373553 A1 | 9/2018 |

OTHER PUBLICATIONS

ISO 26262-1:2018 "Road vehicles—Functional safety—Part 1: Vocabulary", https://www.iso.org/standard/68383.html, retrieved Apr. 28, 2020, 4 pgs.

(Continued)

Primary Examiner — Abdelnabi O Musa

(57) ABSTRACT

Embodiments of a method and device are disclosed. In an embodiment, an in-vehicle network interface device includes a data port to send and receive data packets, a plurality of packet processing pipelines coupled to the data port, each to inspect a single data packet to determine an action to perform on the single data packet, and a safety module to receive the determined action from each packet processing pipeline and to select one of the determined actions to perform on the single data packet and to cause a selected one of the packet processing pipelines to perform the selected action.

20 Claims, 4 Drawing Sheets

(56) References Cited

U.S. PATENT DOCUMENTS

2020/0412813 A1\* 12/2020 Mong ................. H04L 47/2441
2021/0051083 A1\* 2/2021 Gowan ............... H04L 12/4641

OTHER PUBLICATIONS

Perkovic, Natasa et al., "System for Automotive Machine Vision", 2017 IEEE 7th International Conference on Consumer Electronics—Berlin (ICCE—Berlin), Sep. 3, 2017, pp. 243-245, IEEE, Piscataway, NJ, USA.

Sankaran, Jagadeesh et al., "TDA2X, a SoC Optimized for Advanced Driver Assistance Systems", 2014 IEEE International Conference on Acoustic, Speech and Signal Processing (ICASSP), May 4, 2014, pp. 2204-2208, IEEE, Piscataway, NJ, USA.

Tsutomu Matsumoto et al., A Method of Preventing Unauthorized Data Transmission in Controller Area Network, 2012 IEEE 75th Vehicular Technology Conference (VTC Spring 2012), Yokohama, Japan, May 6-9, 2012, IEEE, Piscataway, NJ, pp. 1-5.

\* cited by examiner

AUTOMOTIVE PACKET DATA SWITCH WITH PIPELINE DIVERSITY

BACKGROUND

In Automotive vehicles, the features and performance of Advanced Driving Assistance Systems (ADAS) are steadily increasing and paving the way towards Autonomous Driving beyond Level 3. Associated with this is an increasing demand for Functional Safety, as standardized e.g. in ISO 26262. This applies to almost each sub-system of the vehicle as well as the vehicle communication system. For next generation systems, packet data switches are a key element in automotive in-vehicle communications. Packet data switches will support more mechanisms for Functional Safety and be part of the overall vehicle Functional Safety architecture.

As a consequence, automotive communication applications safety requirements are increasing as well. Increased safety requirements have been applied to Automotive Ethernet, may be applied to future CAN (Controller Area Network) switched communications in zones of the vehicle network architecture, and may also be applied to network systems that are under development or will be developed.

SUMMARY

Embodiments of a method and device are disclosed. In an embodiment, a packet data switch is disclosed with pipeline diversity. In an embodiment, an in-vehicle network interface device includes a data port to send and receive data packets, a plurality of packet processing pipelines coupled to the data port, each to inspect a single data packet to determine an action to perform on the single data packet, and a safety module to receive the determined action from each packet processing pipeline and to select one of the determined actions to perform on the single data packet and to cause a selected one of the packet processing pipelines to perform the selected action.

In further embodiments, the safety module selects one of the determined actions by selecting the action determined by a majority of the packet processing pipelines. In further embodiments, the safety module generates an error flag in response to different determined actions from the plurality of packet processing pipelines. In further embodiments, the safety module comprises a functional safety interface to a connected external device and wherein the safety module sends the error flag to a diagnostic application of the connected external device in a secure mode.

In further embodiments, a first one of the plurality of packet processing pipelines includes a first type of action determination mechanism and a second one of the plurality of packet processing pipelines includes a second type of action determination mechanism. In further embodiments, the first action determination mechanism includes a CAM (Content Addressable Memory) and the second action determination mechanism includes a RAM (Random Access Memory).

Further embodiments include frame counters connected to each packet processing pipeline and to the safety module, wherein the frame counters report frame counts to the safety module and wherein the safety module selects an action in part using the frame counts.

In further embodiments, a first one of the plurality of packet processing pipelines includes a first voltage supply from a first power rail and a second one of the plurality of packet processing pipelines include a second voltage supply from a second power rail. In further embodiments, the first one of the plurality of packet processing pipelines includes a first oscillator and the second one of the plurality of packet processing pipelines include a second oscillator.

In further embodiments, the determined actions include lookup and forward.

One implementation is a method of operating an in-vehicle network interface device that includes receiving data packets at a data port, inspecting a single data packet at each of a plurality of packet processing pipelines coupled to the data port, determining an action at each of the plurality of packet processing pipelines to perform on the single data packet, receiving the determined action from each packet processing pipeline at a safety module, selecting one of the determined actions to perform on the single data packet, and causing a selected one of the packet processing pipelines to perform the selected action.

In further embodiments, selecting one of the determined actions comprises selecting an action determined by a majority of the packet processing pipelines.

Further embodiments include generating an error flag at the safety module in response to different determined actions from the plurality of packet processing pipelines. Further embodiments include sending the error flag to a diagnostic application of a connected external device in a secure mode using a functional safety interface of the safety module.

In further embodiments, determining an action at a first one of the plurality of packet processing pipelines comprises using a first type of action determination mechanism and wherein determining an action at a second one of the plurality of packet processing pipelines comprises using a second type of action determination mechanism.

In further embodiments, the first action determination mechanism includes a CAM (Content Addressable Memory) and the second action determination mechanism includes a RAM (Random Access Memory.

Further embodiments include counting frames for each packet processing pipeline at a frame counter and reporting frame counts to the safety module, and wherein selecting one of the determined actions comprises selecting in part using the frame counts.

Another implementation is an in-vehicle data network switch that includes a data port to send and receive data packets, a plurality of packet processing pipelines coupled to the data port, each to inspect data packets to determine an action to perform on the data packets, a first action determination mechanism including a CAM (Content Addressable Memory) to look up an action and a second action determination mechanism including a RAM (Random Access Memory to look up an action, and a safety module to receive the determined action from each packet processing pipeline and to select one of the determined actions to perform on a respective data packet and to cause a selected one of the packet processing pipelines to perform the selected action.

In further embodiments, the first action determination mechanism includes a first voltage supply from a first power rail and the second action determination mechanism includes a second voltage supply from a second power rail. In further embodiments, the safety module comprises a functional safety interface to a connected external device and wherein the safety module sends an error flag to a diagnostic application of the connected external device in a secure mode.

DETAILED DESCRIPTION

It will be readily understood that the components of the embodiments as generally described herein and illustrated in the appended drawing figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
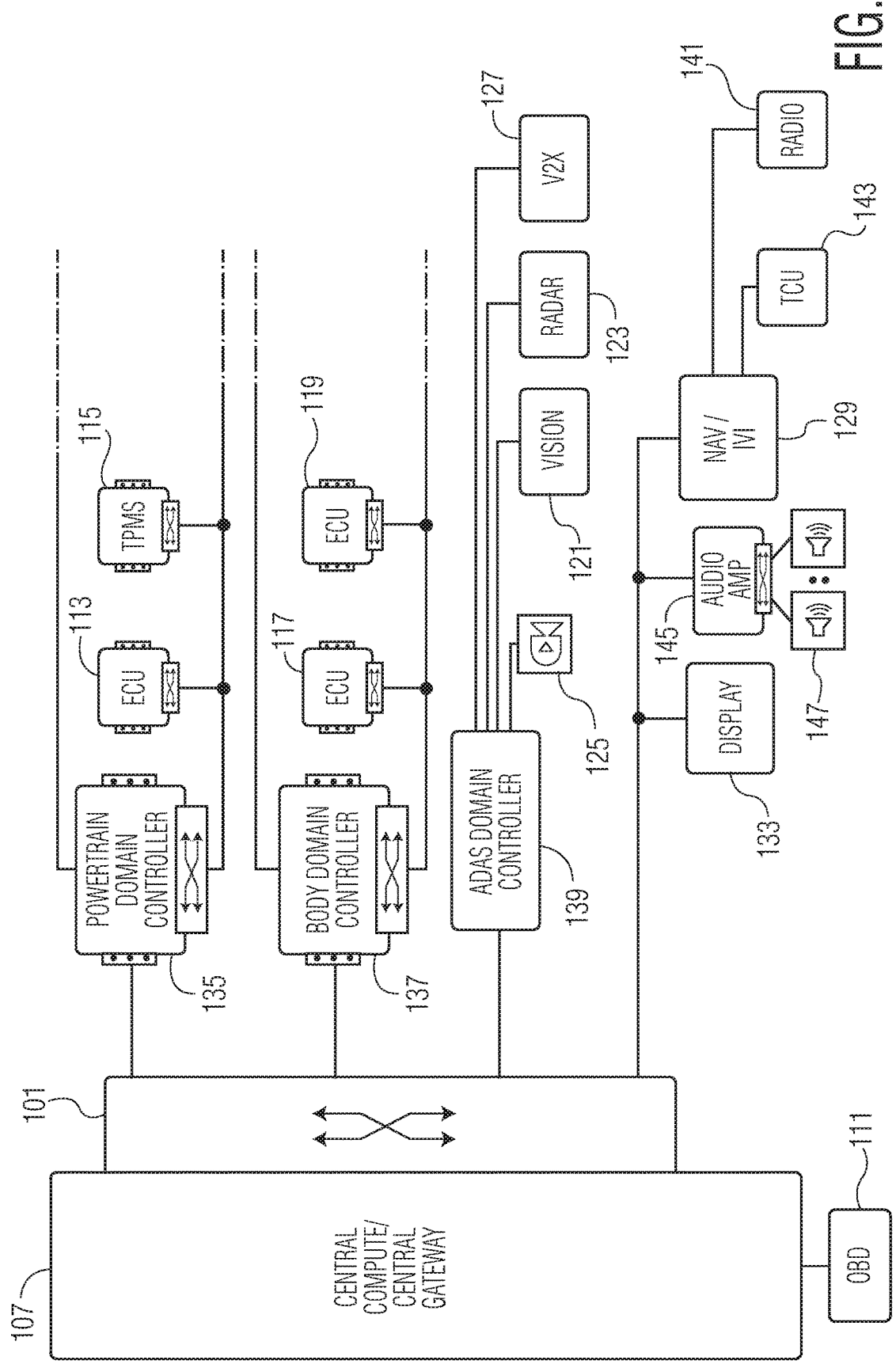
FIG. 1 depicts an in-vehicle communication system with multiple switches and nodes.

FIG. 1 depicts an example of an in-vehicle electronics communications system suitable for use with the present invention and incorporating packet data switches as described herein. The switches may be based on Ethernet or another packet data protocol. The automotive system includes packet data switches integrated into ECUs (Electronic Control Units) distributed throughout the vehicle. Alternatively, one or more of the switches may be independent of an ECU. As shown, a central processor 107 includes a main gateway switch 101 that is coupled to other devices 129, 133, 145 and controllers 135, 137, 139. The central processor 107 is further coupled to an OBD (On-Board Diagnostics) port 111 for external maintenance, control, and monitoring.

In this example, the central processor is coupled through the packet data gateway to a powertrain domain controller 135, a body domain controller 137, and an ADAS (Advanced Driver Assistance System) controller 139. These controllers each include another integrated packet data switch for connection to other components. As examples, the powertrain domain controller 135 is coupled through its switch to an ECU 113, such as an engine management unit, and a TPMS (Tire Pressure Monitoring System) module 115. The body domain controller 137 is coupled to two other body control ECUs 117, 119 such as for steering and brakes. The ADAS domain controller 139 is coupled to a variety of sensors such as cameras 121, radar 123, LIDAR 125, and a vehicle cellular radio 127 for communication with other vehicles and roadside objects.

A navigation and in-vehicle infotainment system 129 may also be coupled to the central gateway 101. This system may include connection through its own packet data switch to a TCU (Telematics Control Unit) 143 that may include inertial sensors and satellite positioning receivers, a radio 141 and other entertainment signal sources, an audio amplifier 145 and a loudspeaker system 147. One or more displays 133 are coupled to the central gateway and may also offer user input through touchscreen and physical button and switch interfaces.

The packet data switches may be configured as parts of systems on a chip (SoC) as shown, systems in a package (SiP) or in any other suitable way. The packet data switches connect the processors and memory to multiple nodes of which several examples are shown. However, more or fewer nodes of more or different types may be used in the system.

The packet data switches allow each node to communicate with each processor, each sensor, each input and each output device. Some of the connections are direct and some of the connections are indirect. Data storage may be incorporated into the processors, on die or on package, or into other nodes and each node may include data storage.

Ever more automotive sensors and other nodes are proposed and with this increasing complexity and an increasing desire for autonomous driving, it is increasingly difficult to assure fast reliable operation. Some of the reliability is ensured in how different nodes are connected so that, for example, braking happens on a dedicated connection, while an entertainment channel selection can be implemented more indirectly. Some of the reliability is targeted by new reliability standards, referred to as Functional Safety mechanisms in Networking Switches. The focus is on the improved usage of memory resources for redundancy and suitable interaction with other functions of the Functional Safety architecture in order to mitigate the risk of a system performance degradation. Although the current revisions of automotive switches feature some level of Functional Safety, this will not be sufficient for future generations of those devices to comply with the needs in future semi-autonomous and fully autonomous driving.

Figure 2:
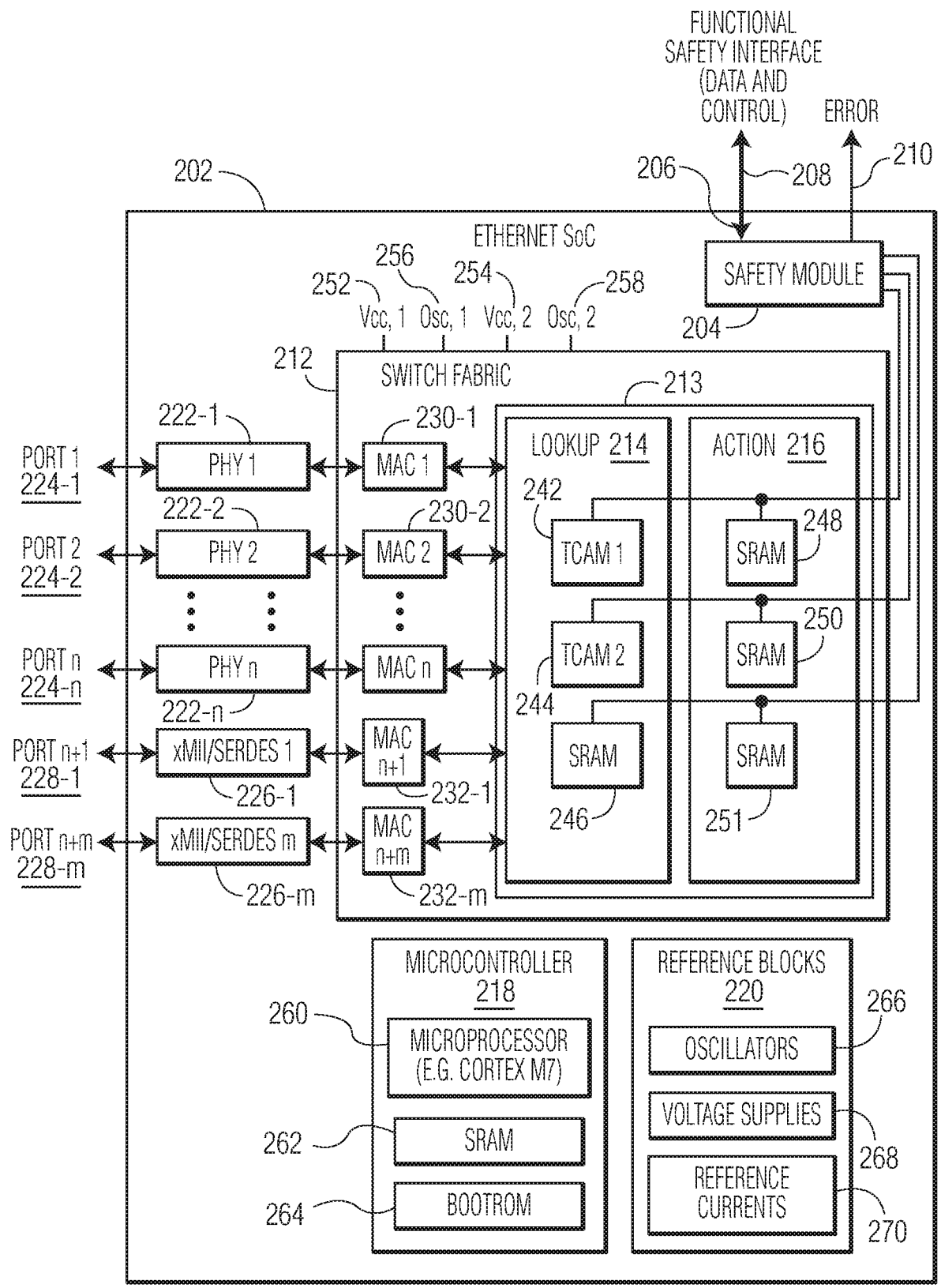
FIG. 2 depicts an automotive packet data switch with pipeline diversity.

FIG. 2 is a block diagram of an Ethernet SoC (System on a Chip) 202 such as a packet data switch suitable for use in an in-vehicle communications system such as the central gateway 101, or other switches of FIG. 1 that are coupled to or integrated with a vehicle ECU. While an Ethernet switch is shown and described, the Ethernet SoC 202 may be adapted to suit other packet data protocols. Other packet data types may also be processed including CAN and LIN (Local Interconnect Network) data, among others using the same or similar structures. The system includes a switch fabric 212, a microcontroller 218, reference blocks 220 and physical input interfaces PHY 222, 226 all on a single die and packaged as an integrated unit. Alternatively, the switch may be configured as a SIP (System in a Package) with multiple dies together performing all of the described functions and perhaps more functions. The dies are then all mounted in a single package as a single unit.

The switch has multiple I/O (input/output) ports, such as (n) Ethernet ports 224-1, 224-2 . . . 224-n, and (m) other additional ports 228-1 . . . 228-m indicated in this example as xMII (x Media Independent Interface, such as Reduced MII and Gigabit MII) or Serial ports, such as serial GMII or other protocols. More or other ports may be used to suit particular implementations. The ports in this embodiment are primarily to provide packet data with metadata, such as headers and footers, that facilitate packet inspection. Even with serial ports, if these are directly connected to another node, the connection may be used to provide source and destination information.

The ports are each coupled to respective physical interfaces. The (n) Ethernet ports may be connected to (n) respective physical Ethernet interfaces, such as Ethernet PHY 222-1, 222-2 . . . 222-n. The Ethernet PHY may be a dedicated chip in a SiP implementation or a portion of a die in, for example, an SOC implementation. They PHY sections may be dedicated to support a particular protocol, such as 100BASE-T1 for Automotive Ethernet, or any other protocol for IEEE 802.3 or another communications system. The xMII ports are also coupled to respective physical interfaces such as SERDES (Serializer/Deserializer) PHY 226-1 . . . 226-m.

The SERDES physical interfaces (PHY) 222, 226 are coupled to a switch fabric 212 which, in this example, provides a MAC (Media Access Control) interface 230-1, 230-2 . . . 230-n for each Ethernet PHY 222 and a MAC interface 232-1 . . . 232-m for each SERDES PHY 226. The MAC interfaces are each coupled to a packet processing pipeline 213 also referred to as a switch core which has a Lookup section 214 for packet inspection and analysis and an action section 216 to act based on the results of the lookup. The actions may include forwarding, adding a timestamp, or changing a header field such as for VLAN tagging, among others. The Lookup section 214 uses at least two different types of memory access systems. In this example, there are two TCAMs (Ternary Content Addressable Memory) lookup processing mechanism 242, 244. These may be of a different memory or other CAM type and one SRAM (Static Random Access Memory) lookup processing mechanism 246 or other memory type. The action section 216 uses only one type of memory access system and has three SRAMs 248, 250, 251, but a different memory type and diversity memory types may be used instead.

In the Lookup section 214, a decision is made based on several parameters. The decision may be affected by the configuration of the lookup memories and various issues in the received packets. If there is an error in the TCAM or the packet or any other common cause error or failure, e.g. a Single Point Failure, then the overall safety of the system may be impaired. If the error or failure mode is extreme enough, then Functional Safety may be violated.

In the example of FIG. 2 the Lookup section and the action determination may operate in a redundant manner. Using three identical packet processing pipelines provides a first level of redundancy. In some embodiments, this is sufficient to ensure the elimination of some errors. Another approach to this redundancy is to apply diversification of memory. As shown, two different memory technologies are used TCAM and random access memory, although other alternative types of memory may be used instead. As shown, the MAC interfaces 230, 232 connect to the same Lookup section. Typically, there is a unique packet processing pipeline in the Lookup section for each MAC interface. Each pipeline reaches a unique consequent action after a lookup. In the illustrated embodiment, there are three pipelines that process the same packet independently. A single packet is received in the Lookup section e.g. from MAC 1 232-1 and processed through each of the three independent lookup processing mechanisms 242, 244, 246. Similarly, the next packet e.g. from MAC 2 232-2 is also processed through each of the three independent lookup processing mechanisms 242, 244, 246. Two of the lookup processing mechanisms use a TCAM and one of the lookup processing mechanisms uses an SRAM. However, this configuration of redundant and diverse mechanisms may be modified to suit particular applications.

Each of the three independent lookup processing mechanisms 242, 244, 246 is coupled to a respective independent SRAM 248, 250, 251 action determination mechanism. These each yield an independent result that depends in part on the input from the respective connected lookup processing mechanism 242, 244, 246. While the action determination mechanisms are each shown as using SRAM for a physical implementation, other configurations may be used and diversity of memory may also be used as in the Lookup section.

The three independent action determinations from each of the three independent packet processing pipelines are monitored by a safety module 204 of the Ethernet SoC 202 that is coupled to each pipeline to receive the three determined actions. The safety module 204 provides real time monitoring of the decisions reached by the individual packet processing pipelines. The safety module determines whether the determined actions are consistent across all three pipelines for the same packet. When the determined actions are consistent, then any one of the packet processing pipelines may take the action to process the single packet. In some embodiments, one of the pipelines is configured to be primary and will always perform the determined action when the pipelines are consistent. In some embodiments, the other two pipelines serve primarily as a safety check to ensure the accuracy and reliability of the primary pipeline.

Each pipeline is represented by a table in the Lookup section 214 and a table in the action section 216. A first packet processing pipeline is the first TCAM 242 and the connected SRAM 248 and the connection between them. The packet is received from any one of the MAC interfaces processed through the determined action in the SRAM 248 action section and then returned to the same MAC interface to exit an appropriate Ethernet PHY 222. The second packet processing pipeline includes the second TCAM 244 and connected SRAM 250. The third packet processing pipeline includes the third table, in this diversity example the SRAM 246 and connected action determination SRAM 251. This allows a single packet to be processed through the Lookup section 214 and action section 216 by each pipeline independently. Each pipeline independently determines an action for the single packet. While three packet processing pipelines are shown more or fewer may be used. With three pipelines, majority voting is simplified, especially when only one pipeline produces a different action determination.

If the determined actions are not consistent, then one of the determined actions is selected. The selection of which pipeline takes priority may be a configuration parameter or a hardware setting. Alternatively, a majority voting mechanism may be used in the event that the primary pipeline produces a different action from the other two pipelines. As the determined actions are all received at the safety module 204, the safety module may select the determined action and generate an error flag 210 when there is a conflict between the pipelines. The error flag is sent to an external supervisor such as an appropriate one of the connected processors 107, 109 or a dedicated maintenance device.

In addition to triggering a fail-safe state through an error flag 210, the safety module 204 may include a data and control interface 206 with the external supervisor. Using the data and control interface 206, the safety module 204 is able to communicate Functional Safety data to the supervisor. This may include further data such as an error cause. Communication with the supervisor may be connected to an application or higher instance within the Functional Safety architecture. The application may perform further diagnosis and defect analysis for the vehicle.

The Ethernet SoC 202 may further include a microcontroller 218 with a microprocessor 260 connected to a working and cache memory, such as SRAM 262 and an instruction and configuration store, such as a Boot ROM (Read Only Memory) 264. The microcontroller 218, as well as the processors 107, 109 may be a central processing unit (CPU), digital signal processor (DSP), microcontroller, or any other digital system with multiple processors and multiple memories. The processors may be of different types with different tasks and different power profiles. Some of the processors may work together on a single combined task to improve the total throughput. The memories may be volatile or nonvolatile and take any of a variety of different physical forms including SRAM (Static Random Access Memory), DRAM (Dynamic Random Access Memory), flash, magnetic, optical, or another.

In some embodiments, the microcontroller 218 performs the higher instance application functions instead of, or in cooperation with, the external device coupled to the Functional Safety data and control interface 206. In some embodiments, the microcontroller 218 performs the selection of the determined action when the results of the diversity packet processing pipelines are inconsistent. In some embodiments, the safety module 204 is implemented as a function of the microcontroller 218. In some embodiments, the safety module 204 is an independent circuit that is coupled to the microcontroller 218.

In some embodiments, the safety module 204 is configured such that resolving action is taken in self-responsibility. In such embodiments, the error flag is sent to the external device but the safety module resolves the error independently. The resolving action may include noting the incident that caused the error flag in a predefined memory space for later inspection. The packet processing continues to operate. The error flag is still sent. In some embodiments, the safety module indicates an incident via an error flag and prepares a set of additional information to send to the higher instance at the external device, e.g. a processor 107, 109 that manages network and communication availability and that signs responsibility for further actions. In some embodiments, communications between the safety module 204 and higher instance is in a secured mode that can be a handshake or mechanism that guarantees higher safety. The particular security implementation may be adapted to suit different safety requirements for the vehicle.

The Ethernet SoC 202 may further include a variety of different reference blocks 220. The reference blocks may include oscillators 266, voltage supplies 268, and reference currents 270. The blocks are shown as being in a single physical location on the die, however, this is for ease of understanding and these blocks may have many instances distributed through the Ethernet SoC 202. The voltage supplies are coupled to the switch fabric 212 as a first Vcc 252 and a second Vcc 254. The oscillators are coupled to the switch fabric 212 as a first Osc 256 and a second Osc 258. In some embodiments, the two Vcc's 252, 254 are each provided from different voltage supplies 268. The two Vcc's 252, 254 may also be coupled each to a different reference current 270. In some embodiments the voltage supplies are each fed from a different power rail supplied externally to the Ethernet SoC 202 each with a different reference voltage and reference current source. A first power rail supplies the first Vcc and a second power rail supplies the second Vcc. In some embodiments, different circuits for voltage supplies 268 and reference currents 270 are coupled to the same external power rail. Similarly, the two Osc's 256, 258 may be supplied by oscillators 266 that are each generated independently from a common reference master oscillator or each from a different reference oscillator.

The two different Vcc's and OSC's are coupled to two different packet processing pipelines. In some embodiments, the TCAM 242, 244 packet processing pipelines receive the first Vcc 252 and Osc 256 while the SRAM 246 packet processing pipeline receives the second Vcc 254 and Osc 258. While two are shown, each pipeline may have a different Vcc and OSC. The diversification significantly increases the functional safety level as the different memory technologies refer to different voltage supply and different clock systems. The different memory technologies may also refer to different self-tests, and different self-healing mechanisms. This diversification decreases many possible common cause failures. As with the reference blocks 220, the physical interfaces (PHY) 222, 226 and the MAC interfaces 230, 232, the different memory entities may be located on one microchip, as different dies within a microchip package, or as standalone components on a printed-circuit board.

Figure 3:
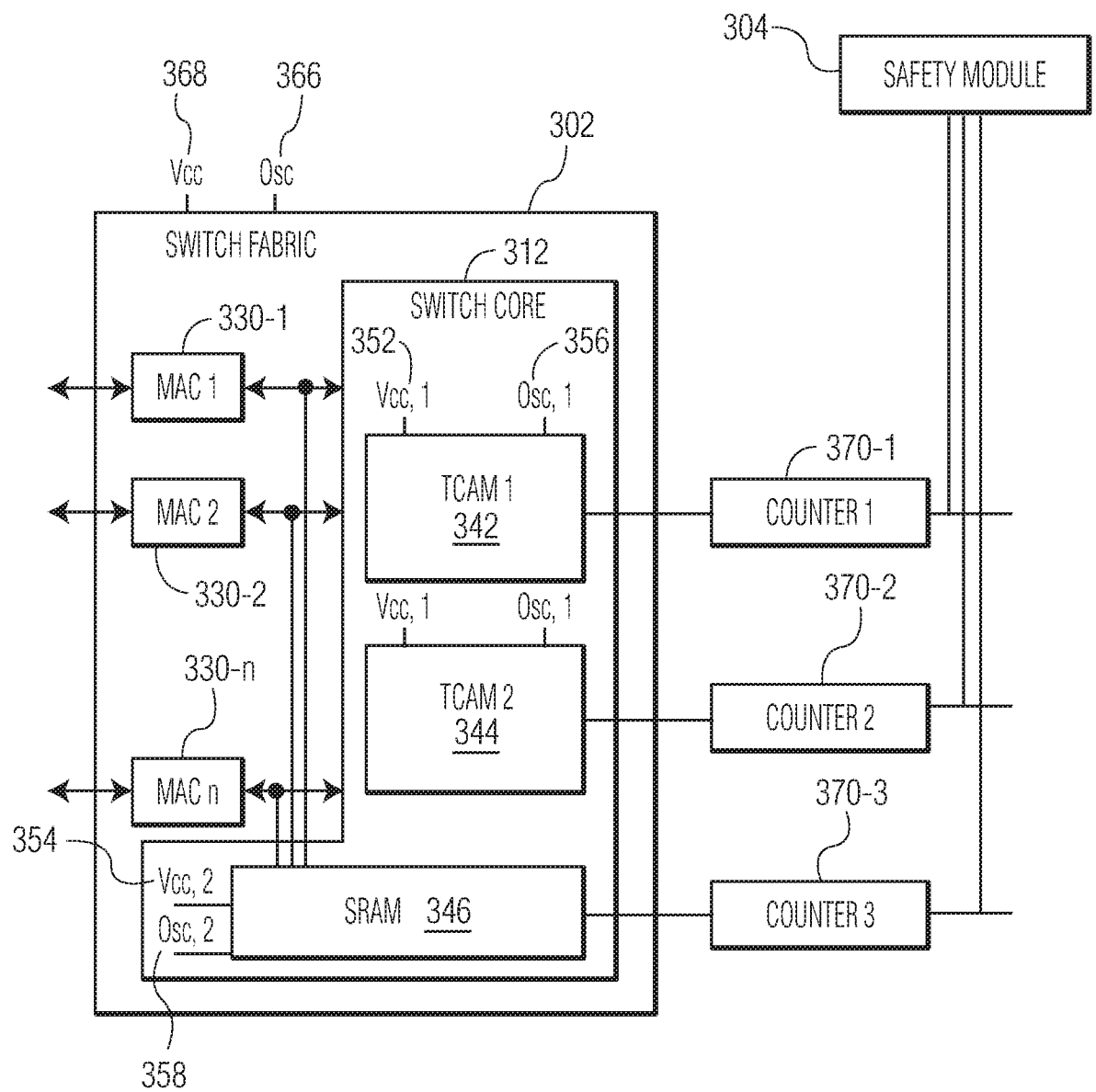
FIG. 3 depicts an alternative automotive packet data switch with pipeline diversity.

FIG. 3 depicts a block diagram of an alternative configuration of a portion of the Ethernet SoC 202 of FIG. 2. This switch fabric includes multiple MAC interfaces 330-1, 330-2 . . . 330-n that are coupled to a switch core 312. The switch core 312 includes three packet processing pipelines shown partially in this diagram. The first packet processing pipeline includes a TCAM 342 coupled to a first voltage supply Vcc 352 and a first oscillator Osc 356. The second packet processing pipeline includes a second TCAM 344 coupled to the same Vcc 352 and Osc 356. The third packet processing pipeline includes an SRAM 346 coupled to a second Vcc 354 and a second Osc 358. This provides the memory diversity and the voltage, current, and oscillator diversity discussed above with respect to FIG. 2 to reduce common cause failures and to enhance functional safety.

Each pipeline is coupled to a respective counter. The first pipeline, represented by the first TCAM 342, is coupled to a first counter 370-1. The second pipeline, represented by the second TCAM 344, is coupled to a second counter 370-2. The third pipeline, represented by the SRAM 346, is coupled to a third counter 370-3. There may be additional counters for additional pipelines. While the counters are shown as separate entities for ease of understanding, a single circuit or module may implement all of the counters. The counters are coupled to a safety module 304 of the switch which may be implemented as a separate circuit or as part of an internal or external processor (not shown). The counters are used for frame counting for each respective packet processing pipeline. The frame counters 370 report the frames counts to the safety module 304. The safety module 304 compares the frame counts from each counter. In some embodiments, the safety module determines if there is a difference in the frame count for a packet and sends an error flag in response to the difference. In some embodiments, the safety module compares the frame counts and selects a determined action in response to the frame count. For example, if a packet processing pipeline uses excess frames to determine an action, then the safety module may ignore that action and select a different action for the respective packet.

The Ethernet switch described herein may be utilized in many different applications, such as an automotive body domain controller, gateway controller, or zonal controller, among others. The switch may also be used in other non-automotive applications for enhanced safety or reliability. As described herein, diversity of memory types increases the functional safety level. Diversity of voltage supply further increases the functional safety level and diversity of oscillators still further increases the functional safety level. In addition, diversity may be extended to include diversity of reference currents. Each of these elements may be used independently or together as shown. These diversity measures each reduce the sensitivity of the switch to common cause faults.

Faults may be detected by observing the determined action from each of the diverse packet processing pipelines. Further fault detection may be performed using frame counters to compare the operation of each packet processing pipeline. The described implementation is flexible and may be reconfigured to suit different purposes. As an example, in case there is no need for functional safety the conventional memory (e.g. SRAM) may be configured not as a redundant entity of the TCAM but as an independent memory entity. The three packet processing pipelines may be configured to operate independently to triple the output of the switch for situations in which speed is more important than safety.

The safety module is configured to observe the operation of the packet processing pipeline and collect information regarding any fault incidents. The safety module may operate independently to correct any observed incidents and it may share any incidents with a higher instance. In some embodiments, the safety module takes over decisions of how to resolve detected differences in the redundancy mode between TCAMs and conventional memory. In some embodiments, the safety module may leave the decision for action to a host controller or a higher instance in the Functional Safety architecture to ensure network and communication availability. The described configurations may be in one microchip, a multi-die system in a microchip package, standalone components on a printed-circuit board or other physical implementations.

Figure 4:
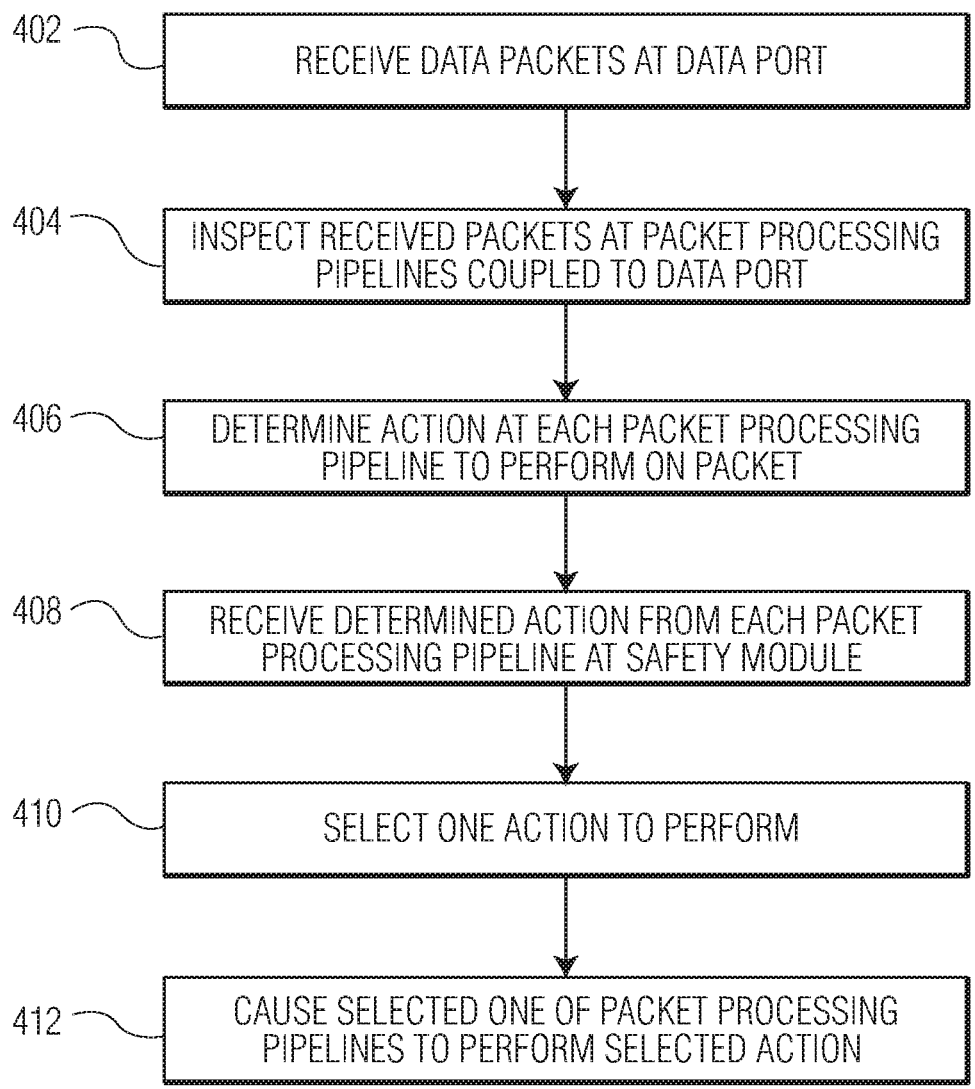
FIG. 4 is a process flow diagram of operating an automotive packet data switch.

FIG. 4 is process flow diagram of an operation of the Ethernet SoC 202 and of the modifications in FIG. 3. At block 402, data packets are received at data ports of the switch. The packets may come from any of the nodes of the system and be directed to any other node. The data packets may be in a 100BASE-T1 format for Automotive Ethernet or xMII format. However, any other packet data format may be used to suit the needs of the particular node and the networks.

At block 404, the packets are transferred through the physical interfaces and the MAC interfaces to multiple packet processing pipelines and the packets are subjected to inspection at each pipeline. The multiple pipelines may be the same or use various types of diversity including memory diversity, Vcc diversity, Osc diversity, reference current diversity, and other types of diversity.

After packet inspection, then at block 406, an action is determined at each packet processing pipeline to determine an action for the packet. The action may be to forward the packet to another node based on source or destination information in the packet or both. Other actions may also be supported including lookup, etc.

At block 408, the determined actions for each pipeline are sent from each pipeline to the safety module. The safety module receives these determined actions and at block 410 selects one of the actions to be performed on the respective packet. When the system is operating properly, then the three determined actions will be the same. However, when there is a fault, there will be more than one determined cation. The safety module may choose the action based on a preferred pipeline, majority voting or another process.

At block 412, the selection action is performed by a pipeline that determined that action. In many cases, the packet will be forwarded by the selected pipeline through the MAC interface and the PHY interface to another node.

When the packet processing pipelines determine different actions for a respective packet, then the safety module generates an error flag that may be sent to a diagnostic application of a connected external device in a secure mode. In some embodiments, counters count the frames used by each packet processing pipeline and send the frame counts to the safety module for use in selecting a determined action.

It should be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An in-vehicle network interface device comprising:
 a data port configured to send data packets to an in-vehicle network and to receive data packets from the in-vehicle network;
 a plurality of packet processing pipelines coupled to the data port, each pipeline configured to inspect a single data packet, and each configured to determine a packet processing action to perform on the single data packet based on the inspection of the data packet, wherein the packet processing pipelines are configured to determine a packet processing action for in-vehicle network communications for the same packet independently;
a safety module configured to:
receive the determined packet processing action from each packet processing pipeline;
determine whether the determined packet processing actions are consistent across the plurality of packet processing pipelines;
select one of the determined packet processing actions to perform on the single data packet based on whether the determined packet processing actions are consistent; and
generate an error flag when the determined packet processing actions are not consistent.

2. The device of claim 1, wherein the safety module selects one of the determined packet processing actions by selecting the action determined by a majority of the packet processing pipelines.

3. The device of claim 1, wherein the safety module selects one of the determined packet processing actions as an action of a primary packet processing pipeline from the plurality of packet processing pipelines.

4. The device of claim 1, wherein the safety module comprises a functional safety interface to a connected external device and wherein the safety module is configured to send the error flag to a diagnostic application of the connected external device in a secure mode.

5. The device of claim 1, wherein a first one of the plurality of packet processing pipelines includes a first type of action determination mechanism and a second one of the plurality of packet processing pipelines includes a second type of action determination mechanism.

6. The device of claim 5, wherein the first action determination mechanism includes a CAM (Content Addressable Memory) and the second action determination mechanism includes a RAM (Random Access Memory).

7. The device of claim 1, further comprising frame counters connected to each packet processing pipeline and to the safety module, wherein the frame counters are configured to report frame counts to the safety module and wherein the safety module is configured to select the packet processing action in part using the frame counts.

8. The device of claim 1, wherein a first one of the plurality of packet processing pipelines includes a first voltage supply from a first power rail and a second one of the plurality of packet processing pipelines includes a second voltage supply from a second power rail.

9. The device of claim 1, wherein the first one of the plurality of packet processing pipelines includes a first oscillator and the second one of the plurality of packet processing pipelines includes a second oscillator.

10. The device of claim 1, wherein the determined packet processing actions include lookup and forward.

11. The device of claim 1, wherein the packet processing pipelines are configurable to inspect different data packets.

12. A method of operating an in-vehicle network interface device comprising:
receiving data packets from an in-vehicle network at a data port;
inspecting a single data packet at each of a plurality of packet processing pipelines coupled to the data port, wherein the packet processing pipelines inspect the same packet independently;
determining a packet processing action independently based on the inspection at each of the plurality of packet processing pipelines to perform on the single data packet for in-vehicle network communications;
receiving the determined packet processing action from each packet processing pipeline at a safety module;
determining whether the determined packet processing actions are consistent across the plurality of packet processing pipelines;
selecting one of the determined packet processing actions to perform on the single data packet based on whether the determined packet processing actions are consistent; and
generating an error flag when the determined packet processing actions are not consistent.

13. The method of claim 12, wherein selecting one of the determined packet processing actions comprises selecting a packet processing action determined by a majority of the packet processing pipelines.

14. The method of claim 12, further comprising selecting one of the determined packet processing actions as an action of a primary packet processing pipeline from the plurality of packet processing pipelines.

15. The method of claim 14, further comprising sending the error flag to a diagnostic application of a connected external device in a secure mode using a functional safety interface of the safety module.

16. The method of claim 12, wherein determining the packet processing action at a first one of the plurality of packet processing pipelines comprises using a first type of action determination mechanism and wherein determining the packet processing action at a second one of the plurality of packet processing pipelines comprises using a second type of action determination mechanism.

17. The method of claim 12, further comprising counting frames for each packet processing pipeline at a frame counter and reporting frame counts to the safety module, and wherein selecting one of the determined packet processing actions comprises selecting in part using the frame counts.

18. An in-vehicle network interface device comprising:
a data port configured to send data packets to an in-vehicle network and to receive data packets from the in-vehicle network;
a plurality of packet processing pipelines coupled to the data port, each pipeline configured to inspect data packets, and each to determine a packet processing action for in-vehicle network communications to perform on the data packets based on the inspections of the data packets, a first one of the plurality of packet processing pipelines having a first action determination mechanism including a CAM (Content Addressable Memory) configured to look up an action and a second one of the plurality of packet processing pipelines having a second action determination mechanism including a RAM (Random Access Memory) configured to look up an action, wherein the packet processing pipelines inspect the same packet independently; and
a safety module configured to:
receive the determined packet processing action from each packet processing pipeline;
determine whether the determined packet processing actions are consistent across the plurality of packet processing pipelines;
select one of the determined packet processing actions to perform on the single data packet based on whether the determined packet processing actions are consistent;
generate an error flag when the determined packet processing actions are not consistent.

19. The device of claim 18, wherein the first action determination mechanism includes a first voltage supply and first reference current from a first power rail and a first oscillator and wherein the second action determination mechanism includes a second voltage supply and second reference current from a second power rail and a second oscillator.

20. The device of claim 18, wherein the safety module comprises a functional safety interface to a connected external device and wherein the safety module is configured to send the error flag to a diagnostic application of the connected external device in a secure mode.

* * * * *